United States Patent

[11] 3,628,885

| [72] | Inventors | Sidenstick, James E.;<br>Richard W. Brown; Herbert E. Nichols;<br>Frederick Burggraf, all of Cincinnati, Ohio |
|---|---|---|
| [21] | Appl. No. | 862,904 |
| [22] | Filed | Oct. 1, 1969 |
| [45] | Patented | Dec. 21, 1971 |
| [73] | Assignee | General Electric Company |

[54] FLUID-COOLED AIRFOIL
11 Claims, 5 Drawing Figs.

[52] U.S. Cl. ..................................................... 416/97
[51] Int. Cl. ..................................................... F01d 5/08
[50] Field of Search............................................ 416/95–97,
90, 91, 92; 415/115

[56] References Cited
UNITED STATES PATENTS

| 3,017,159 | 1/1962 | Foster et al. ................ | 416/90 |
| 3,045,965 | 7/1962 | Bowmer ...................... | 416/90 |
| 3,171,631 | 3/1965 | Aspinwall.................... | 416/97 X |
| 3,220,697 | 11/1965 | Smuland et al. ............. | 416/96 |
| 3,301,526 | 1/1967 | Chamberlain................ | 415/115 |
| 3,369,792 | 2/1968 | Kraimer et al. .............. | 415/115 |
| 3,370,829 | 2/1968 | Banthin et al................ | 415/115 |
| 3,388,888 | 6/1968 | Kercher et al. .............. | 415/115 |
| 3,528,751 | 9/1970 | Quinones et al. ............ | 415/115 |

FOREIGN PATENTS

| 1,185,541 | 2/1959 | France ........................ | 416/97 |
| 985,772 | 3/1965 | Great Britain................ | 416/96 |

*Primary Examiner*—Everette A. Powell, Jr.
*Attorneys*—Derek P. Lawrence, Erwin F. Berrier, Jr., Lee H. Sachs, Frank L. Neuhauser, Oscar B. Waddell and Joseph B. Forman

ABSTRACT: An improved fluid-cooled airfoil having spaced leading and trailing edge chambers and a serpentine passage therebetween. Coolant is delivered to the leading and trailing edge chambers, respectively, by an impingement insert and the portion of the serpentine chamber adjacent the trailing edge chamber. Various features, such as turbulence promoters, inclined trailing edge passages and film-cooling passageways, are provided to enhance the heat-transfer properties of the airfoil.

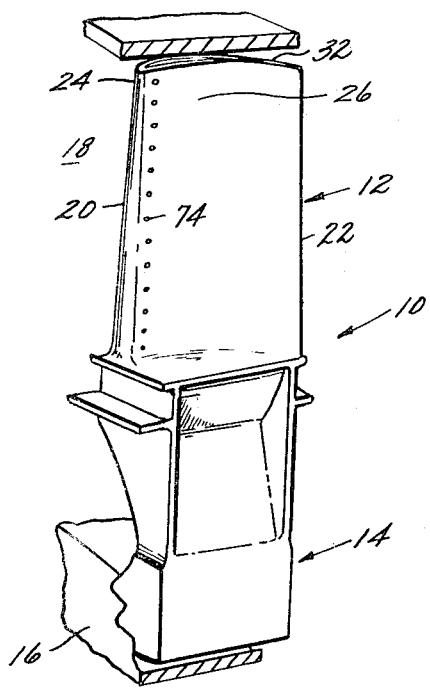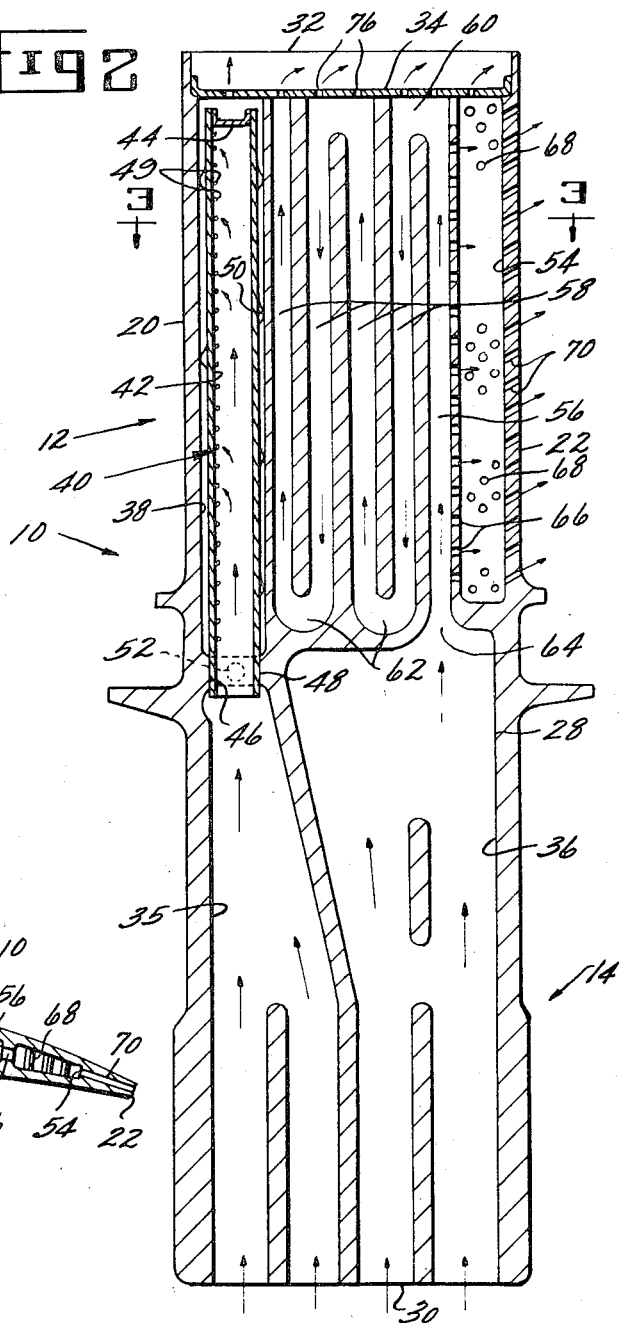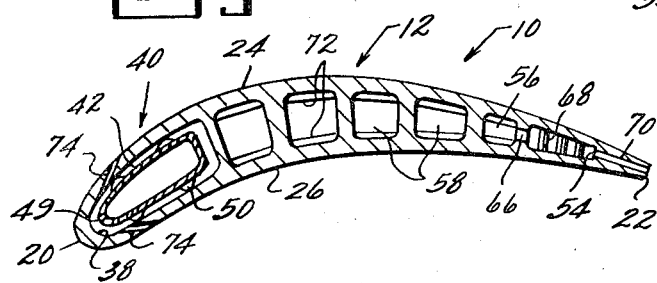

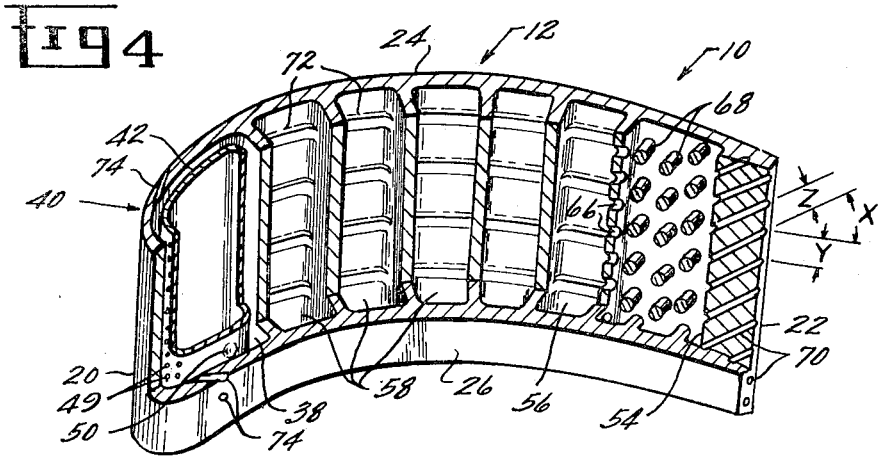
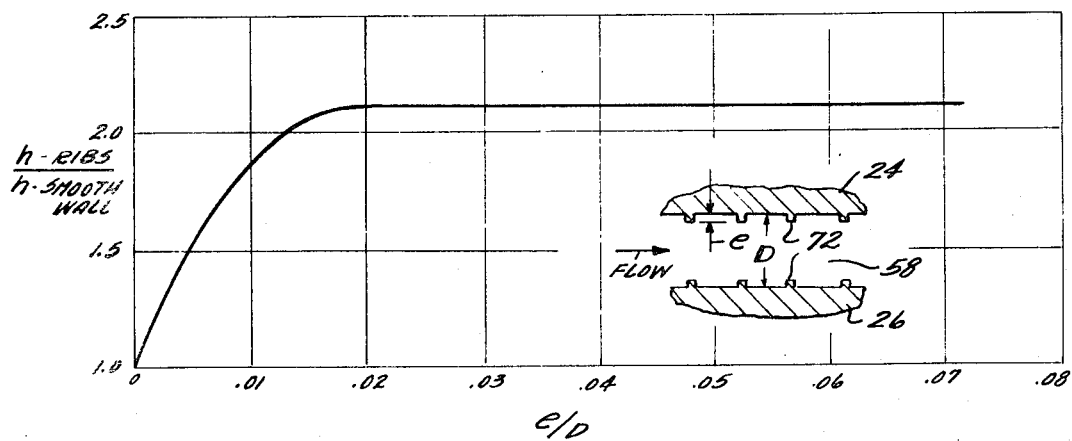

FLUID-COOLED AIRFOIL

This invention relates to turbomachinery and, more particularly, to an improved fluid-cooled airfoil such as a turbine blade for use therein. The invention herein described was made in the course of or under a contract, or a subcontract thereunder, with the United States Department of the Air Force.

It is well known that the efficiency of a gas turbine engine is related to the operating temperature of the turbine and that engine efficiency may be increased, in theory, by increasing the operating temperature. As a practical matter, however, the maximum turbine-operating temperature is generally limited by the high-temperature capabilities of the various turbine elements, with the turbine blades or vanes usually being the most limiting of such elements.

To extend the upper operating temperature of the turbine and, hence, make available some of the theoretical efficiency increase, various designs for cooling airfoils such as turbine blades or vanes using relatively cool air discharged or extracted from the compressor have been devised. One such arrangement is shown in copending application Ser. No. 533,120 filed Feb. 26, 1966, and assigned to the assignee of this application now U.S. Pat. No. 3,533,711 issued Oct. 13, 1970.

With such arrangements, however, since the use of compressor pressurized air represents a charge against or is in and of itself subtractive from engine efficiency, it is important that the heat-transfer properties of the blade be such as to minimize the amount of coolant required to maintain the blade at a satisfactory operating temperature.

Certain efficiency losses in a gas turbine engine usually occur as a result of motive fluid leakage between the turbine blade and cooperating turbine shroud. By effluxing turbine blade cooling air through the outer radial end of the blade it has been found that such leakage may be reduced or eliminated. Accordingly, in terms of overall effectiveness, it is important that the cooling design be such as to allow sufficient discharge of cooling air through the blade tip to effectively block tip leakage.

A primary object of this invention is to provide a fluid-cooled airfoil having improved cooling heat-transfer characteristics.

Another object of this invention is to provide an improved turbine blade of the type adapted to receive compressor pressurized air for cooling purposes.

A further object of this invention is to provide a turbine blade structure, as above, wherein a sufficient portion of the cooling fluid or media may be discharged through the blade tip so as to reduce motive fluid tip leakage.

Yet another object of this invention is a turbomachinery airfoil adapted to efficiently utilize a coolant fluid to achieve reduced peak metal temperatures and thermal gradients.

Briefly stated, the above and other objects which will become apparent upon reading the following description of the preferred embodiment are achieved in the present invention by providing an airfoil having spaced leading and trailing edge chambers and at least one intermediate serpentine passage in flow communication with a source of coolant through that portion of the passage most closely adjacent the trailing edge chamber. Means are provided to receive coolant and impinge it against the leading edge chamber wall to provide a high heat-transfer rate in that sector of the blade. The airfoil may include film-cooling passages formed through one or both sidewalls and communicating with the leading edge chamber to provide a film of coolant along the exterior surface of the sidewalls. The serpentine passage preferably includes means for promoting turbulence in the coolant boundary layer to enhance the heat transfer in the midchord region of the airfoil. Coolant is delivered to the trailing edge chamber through the adjacent serpentine passage portion. In the form of a turbine blade, the airfoil is preferably defined by a hollow cast member having attachment and airfoil portions intermediate an open inner and an outer end. The outer end of the cast member is closed by a perforated tip cap which in part defines and provides an efflux path for the chambers and serpentine passage.

While the specification concludes with claims particularly pointing out and distinctly claiming the subject matter of this invention, it is believed that the invention will be better understood upon reading the following description of the preferred embodiment in connection with the accompanying drawings wherein:

FIG. 1 is a partial perspective view of a turbine rotor employing the improved fluid-cooled airfoil of this invention, with said airfoil taking the form of a turbine blade;

FIG. 2 is a side elevational view, drawn in partial section and to an enlarged scale, of the turbine blade of FIG. 1;

FIG. 3 is an enlarged cross-sectional view taken along lines 3—3 of FIG. 2;

FIG. 4 is a partial perspective sectional view of the airfoil portion of the turbine blade of FIG. 1; and FIG. 5 is a graph showing the improvement in convective heat-transfer coefficient in the midchord region of the turbine blade of FIG. 1.

Like reference numerals will be used in referring to like parts throughout the following description of the preferred embodiment.

With reference now to FIG. 1, the improved airfoil of this invention has been shown in the form of a turbine blade at 10 as comprising an airfoil portion 12 and an attachment or root portion 14 adapted to secure the blade to a turbine rotor 16 in a well-known manner with the airfoil portion 12 extending generally radially across a motive fluid flow passage 18. The airfoil portion 12 includes a leading edge 20 and a chordwise spaced trailing edge 22 which are interconnected by convex and concave sidewalls 24 and 26, respectively. The airfoil portion 12 is suitably shaped in a well-known manner so as to efficiently extract energy from the motive fluid as it flows spanwise of the blade and impart rotary motion to the rotor 16.

As best shown in FIG. 2, the blade structure of this invention is preferably formed as a hollow cast member 28 having an open inner end 30 and an outer or distal end 32. The outer end 32 is closed by a tip cap 34 which may be cast integrally with the member 28 or suitably secured thereto as by welding or brazing.

The root or attachment portion 14 is provided with means, preferably taking the form of plenums or receiving chambers 35 and 36, for receiving a flow of suitable cooling fluid through the open inner end 30. A leading edge chamber 38 extends longitudinally of the airfoil portion 12 and is cooperatively formed by the cast member 28 and the tip cap 34. In order to provide efficient cooling for the leading edge 20, means designated generally at 40 are provided, in flow communication with the cooling fluid of chamber 35, for impinging the cooling fluid against at least the forwardmost portion of the leading edge chamber wall as a plurality of high-velocity jets. The impingement means 40 preferably comprises a thin-wall tubular insert 42 which projects into the leading edge cavity or chamber 38 with its walls in close-spaced relationship to the chamber walls. The insert 42 is provided with a closed outer or distal end 44 and an open inner end 46 in flow communication with the cooling fluid receiving means 35 and engaged with a necked opening 48 formed in the cast member intermediate chambers 35 and 38. The insert 42 is formed with a plurality of small openings or perforations 49 through which the cooling fluid is expanded and impinged against the chamber wall as a plurality of high-velocity fluid jets.

While the coolant-receiving means has been shown as comprising two discrete chambers 35 and 36, it will be recognized that a single chamber may be used.

The insert 42 may be provided with a plurality of projections 50 adapted to engage the leading edge chamber walls to establish proper spacing therebetween. It will be recognized, however, that the projections may be carried by the cast member 28 or other suitable spacing means may be employed.

While the insert 42 is preferably secured to the cast member 28 by brazing in the area of engagement between the insert's open end 46 and the cast member necked opening 48 so as to provide sealing between the coolant-receiving means 35 and the chamber 38, it will be appreciated that other attachment means may be employed either alone or in conjunction with a brazed joint. For example, the insert 42 may be provided with a collar at its open end which abuts the inner end of the chamber 38 and the portion of open end 46 which extends through the neck opening 48 into chamber 35 may be flared outwardly into gripping engagement with the cast member.

When brazing is used to join or secure the insert to the cast member 28, the cast member is preferably formed with ports 52 which communicate with the necked opening 48 so as to enable the use of one port for the supply of braze material to the joint and the other port for inspection of the brazed joint, it being understood that the presence of braze material in such other port would indicate that the braze material has flowed through the joint properly.

To provide cooling to the trailing edge region of the blade, a trailing edge chamber 54, which extends longitudinally of the airfoil portion 12 adjacent its trailing edge 22, is cooperatively formed by the hollow cast member 28 and the tip cap 34.

At least one serpentine coolant flow passage is provided in the midspan region of the airfoil portion 12 or intermediate the leading and trailing edge chambers 38 and 54 by a plurality of longitudinally extending chambers 56, 58, serially connected by alternating outer and inner chordwise passages or openings 60 and 62, respectively. The serpentine passage chamber 56, adjacent the trailing edge chamber 54, is open at its inner end 64 so as to be in flow communication with the coolant-receiving means or chamber 36.

Coolant is preferably delivered to the trailing edge chamber 54 from chamber 56 by a plurality of longitudinally spaced, chordwise passages 66 which are formed through the wall member separating these chambers.

A plurality of pin fins 68, formed integrally with and extending between sidewalls 24, 26, may be provided to enhance the convective heat transfer in the trailing edge region of the blade. To provide further cooling to the trailing edge region of the blade, as well as to provide means for effluxing the coolant from the chamber 54 so as to ensure a continuous flow therethrough, a plurality of trailing edge passages 70 are formed through the trailing edge 22.

In order to minimize the number of trailing edge passages required without increasing the trailing edge metal temperature, the passages 70 are preferably inclined at some angle X relative to the spanwise axis of the blade, as best shown in FIG. 4, so that the metal thickness Y or spacing between passages taken longitudinally of the blade may be increased without increasing the metal thickness Z taken normal to the axes of the passages 70. Since the heat-transfer path is generally normal to the direction of coolant flow through each passage 70, by so inclining the passages the heat-transfer characteristics of the trailing edge may be maintained essentially constant while increasing the longitudinal spacing of the passages and thereby reducing the overall number of such passages and coolant flow requirements.

To increase the convective heat-transfer coefficient between the sidewalls 24, 26 and coolant during flow of the latter through the serpentine passage, the sidewalls are preferably formed with a plurality of turbulence promoters or longitudinally spaced chordwise extending ribs 72 which project into the chambers 56, 58 (FIGS. 3 and 4) and are adapted to disturb and promote turbulence in the adjacent coolant boundary layer. Referring to FIG. 5, wherein the ratio of the heat-transfer coefficient obtained using applicant's ribs 72 to the heat-transfer coefficient in a smooth-walled chamber has been shown as a function of the rib projecting height $e$ and the chamber width D between sidewalls 24 and 26, it will be observed that the convective heat-transfer coefficient using ribs 72 having an $e/D$ ratio greater than approximately 0.02 is substantially increased over that of a smooth wall configuration.

Although FIG. 5 indicates that large $e/D$ ratios are desirable, it will be understood that as dimension $e$ increases, the effective flow area through the chamber 58 decreases and hence pressure losses and flow reductions may be observed. With these constraints in mind, it has been found advantageous to employ a nominal $e/D$ ratio of between 0.06 and 0.07 so that with normal manufacturing or casting tolerance variations, the $e/D$ ratio will remain above 0.02 yet will not increase to a point adversely affecting the flow or pressure characteristics within the serpentine passage.

The longitudinal width of each rib 12 is preferably approximately equal to the rib projecting height $e$, with the longitudinal spacing between ribs being approximately 10 times the rib height $e$.

By using such turbulence promoters, sufficiently high heat-transfer rates may be achieved with lower coolant velocities which, in turn, permit the use of a larger serpentine passage cross section or flow area without increasing coolant requirements. By increasing passage flow area, blade weight is reduced and the thermal mass and thermal response of the midspan region of the blade may be more closely matched to that of the leading and trailing edges so as to reduce temperature gradients.

To provide additional cooling to the midspan region of the blade, film-cooling holes 74, communicating with the leading edge chamber 38, may be provided for delivery of a film or insulating blanket of coolant along the external surface of the sidewalls. While the blade has been shown in FIG. 4 as having one row of longitudinally spaced film-cooling holes through each sidewall, it should be understood that such arrangement may be varied. For example, the film-cooling holes need not be arranged in discrete rows and, in instances where sufficient cooling is provided to the midspan region by other means, film cooling of one or both sidewalls may be eliminated.

As best shown in FIG. 2, the tip cap 34 is preferably formed with a plurality of apertures 76 through which the coolant may efflux from chambers 38, 54, 56 and 58 to provide cooling to the distal end of the turbine blade as well as enhanced blade tip-to-shroud sealing.

The use, operation and function of the present invention are as follows:

Pressurized fluid at a reduced temperature relative to the temperature of the motive fluid in passage 18 and derived from a suitable source such as the compressor of a gas turbine engine is delivered to the blade 10 through its open inner end 30. From receiving chambers 35, 36, the coolant is efficiently directed radially outwardly into the leading edge insert 42 and serpentine passage chamber 56. The tip cap apertures 76 and film-cooling holes 74 are sized relative to the insert impingement apertures 49 such that a sufficient pressure differential is maintained across the insert so that the coolant leaves the insert through apertures 49 as a plurality of relatively high-velocity jets which impinge against at least the forward portion of the leading edge chamber sidewall for efficient cooling of that sector of the blade. The coolant fluid is then further utilized by effluxing same from the chamber 38 through the film cooling holes 74 and the tip cap apertures 76 so as to provide an insulating blanket or film of cooling fluid along the external surface of the blade sidewalls and for cooling of the tip or distal end of the turbine blade.

A portion of the fluid within chamber 56 is delivered to the trailing edge chamber 54 with the remaining portion flowing through the serpentine passage and tip cap apertures 76 to the motive fluid passage 18. The coolant is effluxed from the trailing edge chamber through inclined trailing edge passageways 56 and tip cap apertures 76 to provide cooling for those regions of the blade.

As previously noted, by inclining the trailing edge passages 70, the trailing edge may be maintained at a low operating temperature with either reduced trailing edge chamber flow or with a greater proportion of such flow being discharged through the tip cap 34. By effluxing a larger portion of the coolant through the tip cap 34, improved sealing is achieved between the blade tip and its associated shroud which enhances turbine efficiency and, where the coolant is derived from a gas turbine compressor, offsets a portion of the efficiency loss chargeable to such deviation.

Since the leading and trailing edges of the blade 10 are usually subjected to the most severe temperature environment, by first directing the coolant to the leading and trailing edge portions of the turbine blade 10 and then to the midspan portion of the blade through the serpentine passage and film-cooling holes 74, the present invention increases heat-transfer effectiveness in the leading and trailing edge regions of the airfoil. At the same time, by using turbulence promoters 72, the thermal response of the midpsan region of the airfoil may be closely matched with that of the leading and trailing edge regions so as to minimize temperature gradients.

While the present invention has been described in connection with and is particularly applicable to turbine blades, it will be understood that the present invention is not limited thereto and may be effectively employed in compressor blades as well as static airfoils such as compressor or turbine vanes.

Accordingly, while a preferred embodiment has been depicted and described, it will be understood that many modifications and variations may be made thereto without departing from the fundamental theme of the invention.

What is claimed is:

1. In an airfoil of the type adapted to project into a flow of relatively high-temperature fluid and having chordwise spaced leading and trailing edges interconnected by concave and convex sidewalls, improved cooling means comprising:

a leading edge chamber formed in and extending longitudinally of said airfoil adjacent said leading edge, means disposed internally of said leading edge chamber for receiving a flow of coolant at a reduced temperature relative to said high-temperature fluid and impinging said coolant against at least the forward portion of said leading edge chamber wall as a plurality of high-velocity jets, a trailing edge chamber formed in and extending longitudinally of said airfoil adjacent said trailing edge, a plurality of passageways formed through said trailing edge and communicating with said trailing edge chamber for efflux of coolant therefrom and cooling of said trailing edge, and a plurality of serially connected, longitudinally extending chambers defining at least one serpentine passage intermediate said leading and trailing edge chambers, the serpentine passage chamber adjacent said trailing edge chamber adapted to receive a flow of coolant for said serpentine passage and being in flow communication with said trailing edge chamber for delivery of coolant thereto.

2. The improvement of claim 1 further characterized by and including a plurality of film cooling passageways formed through at least one sidewall and communicating with said leading edge chamber for efflux of coolant therefrom and delivery of a film of coolant along the exterior surface of said sidewall.

3. The improvement of claim 1 further characterized by and including means for promoting turbulence in the coolant boundary layer of said serpentine passage, whereby the cross-sectional flow area of said serpentine passage may be increased to effect close matching of the midspan region thermal response to that of the leading and trailing edge regions without increased coolant requirements.

4. The improvement of claim 1 further characterized in that said trailing edge passageways are inclined relative to the chordwise axis of said airfoil whereby a satisfactory operating temperature may be maintained in the trailing edge with reduced coolant requirements.

5. The improvement of claim 1 further characterized by and including a plurality of pin fins joining said sidewalls and extending across said trailing edge chambers.

6. The improvement of claim 1 wherein said airfoil is formed as a turbomachinery blade and includes an attachment portion and an airfoil portion intermediate and respectively adjacent inner and outer ends, said attachment portion adapted to secure said airfoil to a rotor and formed with a chamber therein for receiving coolant for delivery to said impingement means and said serpentine passage chamber adjacent said trailing edge chamber.

7. The improvement of claim 6 wherein said airfoil is formed with a necked opening intermediate said leasing edge chamber and said attachment portion chamber, said impingement means comprising a perforated tubular insert having an open inner end engaged in said necked opening and a closed outer end, and ports formed through said airfoil and communicating with said necked opening to facilitate forming and inspection of a brazed joint between said insert and said airfoil.

8. The improvement of claim 6 wherein said longitudinal chambers are formed, in part, by a tip cap closing the outer end of said airfoil, said tip cap being perforated for discharge of coolant from said longitudinal chambers.

9. A fluid-cooled blade structure comprising a hollow cast member having airfoil and attachment portions intermediate open inner and outer radial ends, a tip cap secured to said cast member and closing said outer open end, said airfoil portion defined by spaced leading and trailing edges joined by spaced concave and convex sidewalls, means formed internally of said attachment portion for receiving a flow of coolant, a leading edge chamber formed internally of said airfoil portion adjacent said leading edge, said leading edge chamber closed at its outer end by said tip cap, a thin-walled insert secured to said hollow cast member and projecting into said leading edge chamber with its sidewalls in close spaced relationship to the walls of said chamber, said insert disposed in flow communication with said coolant-receiving means, the walls of said insert being perforated so as to impinge coolant fluid from said insert chamber against said leading edge chamber wall, a trailing edge chamber formed internally of said airfoil portion adjacent said trailing edge and closed at its outer end by said tip cap, a serpentine passage formed internally of said airfoil portion, in cooperation with said tip cap, intermediate said leading and trailing edge chambers, with the portion of said serpentine passage adjacent said trailing edge chamber in flow communication with said coolant-receiving means, a plurality of passageways extending between said trailing edge chamber and said adjacent serpentine passage portion for delivery of said coolant to said trailing edge chamber, said tip cap being perforated so as to permit efflux of said coolant from said chambers and said serpentine passage through the outer end of said blade structure, a plurality of film-cooling passages formed through at least one said sidewall for delivery of a film of coolant thereto from said leading edge chamber, and a plurality of passageways formed through said trailing edge for efflux of said coolant from said trailing edge chamber.

10. The fluid-cooled blade structure of claim 3 further characterized by and including a plurality of ribs projecting into said serpentine passage from said sidewalls, with the ratio of rib projecting height to the spacing of said sidewalls being at least about 0.02.

11. The fluid-cooled blade structure of claim 9 further characterized in that said trailing edge passageways are inclined relative to the chordwise axis of said airfoil portion.

* * * * *